United States Patent
Umeyama et al.

(10) Patent No.: US 10,211,440 B2
(45) Date of Patent: Feb. 19, 2019

(54) NONAQUEOUS ELECTROLYTE SECONDARY BATTERY

(71) Applicant: TOYOTA JIDOSHA KABUSHIKI KAISHA, Toyota-shi, Aichi-ken (JP)

(72) Inventors: Hiroya Umeyama, Okazaki (JP); Harunari Shimamura, Toyonaka (JP); Yusuke Fukumoto, Toyonaka (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 369 days.

(21) Appl. No.: 15/073,968

(22) Filed: Mar. 18, 2016

(65) Prior Publication Data
US 2016/0276641 A1 Sep. 22, 2016

(30) Foreign Application Priority Data
Mar. 19, 2015 (JP) ................................ 2015-056587

(51) Int. Cl.
| H01M 2/16 | (2006.01) |
| H01M 10/0525 | (2010.01) |
| H01M 10/0587 | (2010.01) |
| H01M 10/05 | (2010.01) |

(52) U.S. Cl.
CPC ......... *H01M 2/162* (2013.01); *H01M 2/1673* (2013.01); *H01M 2/1686* (2013.01); *H01M 10/05* (2013.01); *H01M 10/0525* (2013.01); *H01M 10/0587* (2013.01); *H01M 2220/20* (2013.01); *Y02E 60/122* (2013.01)

(58) Field of Classification Search
CPC ............. H01M 10/05; H01M 10/0525; H01M 10/0587; H01M 2220/20; H01M 2/162; H01M 2/1673; H01M 2/1686
See application file for complete search history.

(56) References Cited

U.S. PATENT DOCUMENTS

| 2010/0196750 A1 | 8/2010 | Kajita et al. |
| 2011/0091755 A1 | 4/2011 | Kuroda et al. |
| 2014/0023908 A1 | 1/2014 | Ueki et al. |
| 2014/0038025 A1 | 2/2014 | Ha et al. |
| 2014/0123472 A1 | 5/2014 | Iwase |
| 2015/0188109 A1* | 7/2015 | Kim .................. H01M 2/1686 429/144 |

(Continued)

FOREIGN PATENT DOCUMENTS

| CN | 103460443 A | 12/2013 |
| CN | 104081557 A | 10/2014 |

(Continued)

*Primary Examiner* — Carlos Barcena
(74) *Attorney, Agent, or Firm* — Sughrue Mion, PLLC

(57) ABSTRACT

A nonaqueous electrolyte secondary battery includes a fiber layer, which contains fiber composed of a synthetic resin, between a separator and a positive electrode and/or between the separator and a negative electrode. The fiber layer contains at least PVDF and PTFE as components of the synthetic resin configuring the fiber. The PVDF and the PTFE both have an average molecular weight of equal to or greater than 200,000 and equal to or less than 2,000,000. In the components of the synthetic resin configuring the fiber, the content of PVDF is greater than the content of PTFE, and the content of PTFE is equal to or less than 45% by mass with respect to the total amount of the components of the synthetic resin.

6 Claims, 3 Drawing Sheets

(56) References Cited

U.S. PATENT DOCUMENTS

2015/0249243 A1* 9/2015 Nagino ................ D04H 1/413
429/144
2015/0325829 A1 11/2015 Lee

FOREIGN PATENT DOCUMENTS

| DE | 112013000388 T5 | 10/2014 |
|----|----|----|
| JP | 2008-078008 A | 4/2008 |
| JP | 2010205719 A | 9/2010 |
| JP | 2012-074403 A | 4/2012 |
| JP | 2013089323 A | 5/2013 |

* cited by examiner

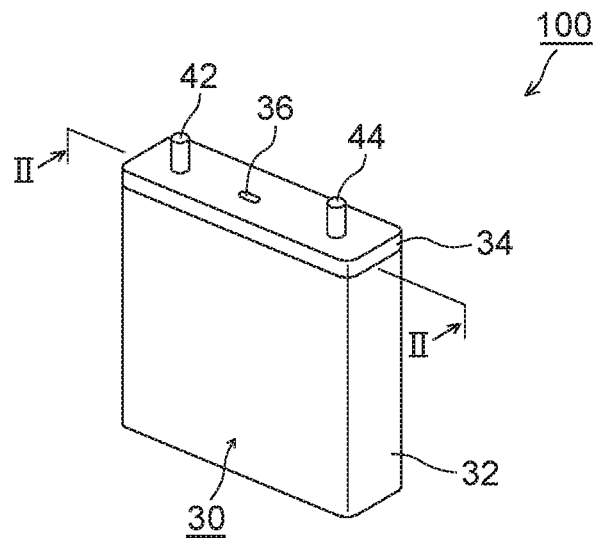
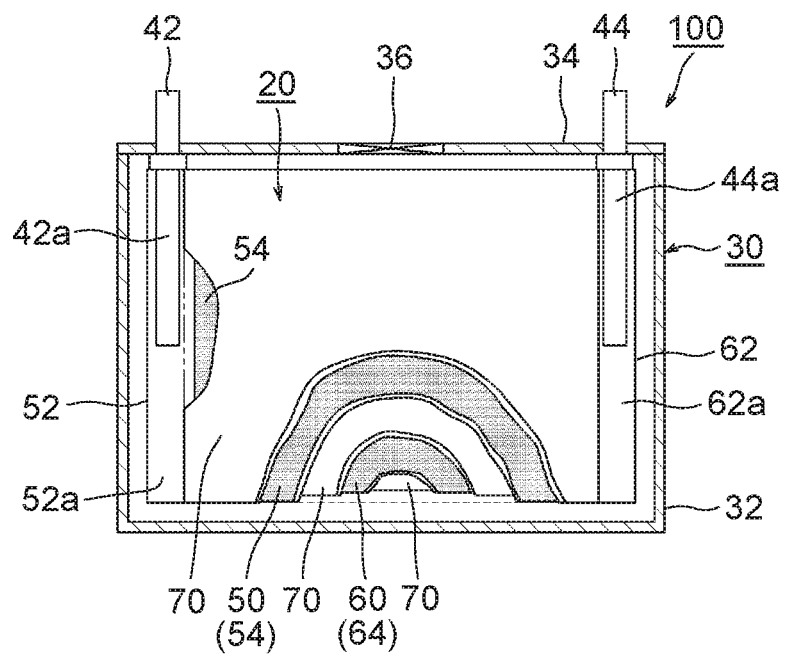

NONAQUEOUS ELECTROLYTE SECONDARY BATTERY

INCORPORATION BY REFERENCE

The disclosure of Japanese Patent Application No. 2015-056587 filed on Mar. 19, 2015 including the specification, drawings and abstract is incorporated herein by reference in its entirety.

BACKGROUND OF THE INVENTION

1. Field of the Invention

The invention relates to a nonaqueous electrolyte secondary battery.

2. Description of Related Art

Compared to existing batteries, nonaqueous electrolyte secondary batteries such as lithium ion secondary batteries (lithium secondary batteries) are lighter in weight and have higher energy density. Therefore, in recent years, the nonaqueous electrolyte secondary batteries have been used as so-called portable power supplies in personal computers, mobile terminals, and the like or as power supplies for driving vehicles. Particularly, the lithium ion secondary batteries which are light-weight and bring about high energy density are preferably used as high-output power supplies for driving vehicles such as an electric vehicle (EV), a hybrid vehicle (HV), and a plug-in hybrid vehicle (PHV).

Typically, a nonaqueous electrolyte secondary battery includes a positive electrode having a positive electrode active material layer, a negative electrode having a negative electrode active material layer, and a nonaqueous electrolyte. It is a battery which is charged and discharged by the travel of charge carriers (for example, lithium ions) in the electrolyte between the electrodes. At the time of charging the nonaqueous electrolyte secondary battery, charge carriers (typically, lithium ions) are released (dissociated) from the positive electrode active material configuring the positive electrode active material layer and are absorbed (inserted) into the negative electrode active material configuring the negative electrode active material layer. Inversely, at the time of discharging the nonaqueous electrolyte secondary battery, charge carriers (typically, lithium ions) are released (dissociated) from the negative electrode active material and are absorbed (inserted) into the positive electrode active material. As the charge carriers (typically, lithium ions) are absorbed into and released from the active materials along with the charge and discharge of the nonaqueous electrolyte secondary battery as described above, the positive and negative electrode active materials (that is, positive and negative electrode active material layers having the active materials) expand and contract.

Typically, such a nonaqueous electrolyte secondary battery is established by accommodating an electrode unit, which consists of a positive electrode and a negative electrode laminated to each other together with a separator interposed therebetween, and an electrolyte in some cases. As the structure of the electrode unit, a laminate-type electrode unit in the form of a laminate of a plurality of planar electrode units, a roll-type electrode unit obtained by winding up a long sheet-like electrode unit in the form of a scroll, or the like is known. If the electrode unit is configured as above, a reaction area between the positive and negative electrodes can be enlarged, and thus the energy density and the output can be improved. Herein, as the separator, a porous film made of a resin is typically used. Such a separator functions to electrically insulate the positive electrode from the negative electrode and to hold the nonaqueous electrolyte. Examples of technical documents relating to such a nonaqueous electrolyte secondary battery include Japanese Patent Application Publication No. 2008-078008 and Japanese Patent Application Publication No. 2012-074403.

In a case where the nonaqueous electrolyte secondary battery configured as above is used in the application in which high-rate charge and discharge are repeated (for example, in a case where the battery is mounted on a vehicle), due to the expansion and contraction of the positive and negative electrode active materials (positive and negative electrode active material layers) accompanied by the charge and discharge, the separator may be pressed, thus pores of the separator may be crushed, and hence the nonaqueous electrolyte held in the pores may be extruded from the electrode unit. As a result, variation occurs in the amount of the nonaqueous electrolyte held in the electrode unit, and accordingly, in the electrode unit, a portion holds a large amount of nonaqueous electrolyte while the other portion holds a small amount of (lack of) nonaqueous electrolyte in some cases. In a case where the roll-type electrode unit is used as an electrode unit, the amount of the held nonaqueous electrolyte varies between the end portion and the central portion in the direction of the winding axis in some cases (that is, variation occurs in the amount of the nonaqueous electrolyte in some cases). Within the electrode unit, in the portion having a small amount of (lack of) nonaqueous electrolyte, so-called liquid shortage easily occurs. In the portion having a small amount of nonaqueous electrolyte (typically, the portion where the liquid shortage occurs), the amount of the nonaqueous electrolyte present is less than the necessary quantity, and the overall charge and discharge performance of the battery tends to deteriorate. Furthermore, within the electrode unit, a battery reaction mainly occurs in the portion having a relatively large amount of nonaqueous electrolyte, and thus the deterioration of such a portion tends to be accelerated. None of the aforementioned phenomena are preferable because they become a factor of performance deterioration (increase of battery resistance, capacity deterioration, and the like). Especially, for the nonaqueous electrolyte secondary battery used in the application in which a high level of high-rate charge and discharge characteristics is required, it is important to suppress the performance deterioration resulting from the variation in the amount of the nonaqueous electrolyte in the electrode unit.

SUMMARY OF THE INVENTION

The invention provides a nonaqueous electrolyte secondary battery excellent in high-rate charge and discharge characteristics. Specifically, the invention provides a nonaqueous electrolyte secondary battery including an electrode unit that excellently holds a nonaqueous electrolyte.

A first aspect of the invention relates to a nonaqueous electrolyte secondary battery including a flat roll electrode unit, in which an elongate positive electrode, an elongate negative electrode, and an elongate separator electrically separating the positive and negative electrodes from each other are superimposed on each other and wound up together in a longitudinal direction, and a nonaqueous electrolyte. The nonaqueous electrolyte secondary battery has a fiber layer, which contains fiber composed of a synthetic resin, at least between the separator and the positive electrode or between the separator and the negative electrode. The fiber layer contains at least polyvinylidene fluoride (PVDF) and polytetrafluoroethylene (PTFE) as components of the synthetic resin configuring the fiber, and the PVDF and the PTFE both have an average molecular weight (number average molecular weight: Mn) of equal to or greater than 200,000 and equal to or less than 2,000,000. In the components of the synthetic resin configuring the fiber, the content of the PVDF is greater than the content of the PTFE, and the content of the PTFE is equal to or less than 45% by mass with respect to the total amount of the components of the synthetic resin.

In the present specification, the "nonaqueous electrolyte secondary battery" refers to a secondary battery including a nonaqueous electrolyte (typically, a nonaqueous electrolyte containing a supporting salt (supporting electrolyte) in a nonaqueous solvent (organic solvent)). Herein, the "secondary battery" generally refers to a battery that can be repeatedly charged and discharged, and is a term including a so-called chemical cell such as a lithium ion secondary battery and a physical cell such as an electric double layer capacitor. Furthermore, in the present specification, the "average molecular weight" of the components of the synthetic resin means a number average molecular weight, and for example, a value measured by gel permeation chromatography (GPC) can be adopted.

As described above, the nonaqueous electrolyte secondary battery includes the fiber layer between the separator and the positive electrode, or between the separator and the negative electrode. Accordingly, even if the battery is in an environment in which pressure is applied to the separator, the crushing of the pores of the separator can be inhibited. Furthermore, even in a case where the separator is pressed and thus the nonaqueous electrolyte is extruded from the separator, by disposing the fiber layer between the separator and the positive electrode, or between the separator and the negative electrode, the nonaqueous electrolyte extruded from the separator can be held in the fiber layer adjacent to the separator. As a result, it is possible to prevent the occurrence of variation (for example, the occurrence of the liquid shortage) in the amount of the nonaqueous electrolyte in the electrode unit. That is, the nonaqueous electrolyte secondary battery configured as above can prevent the deterioration of the battery performance resulting from variation in the amount of the nonaqueous electrolyte in the electrode unit, and can be provided as a nonaqueous electrolyte secondary battery excellent in high-rate charge and discharge characteristics. Herein, because of containing PVDF, the fiber layer has excellent characteristics (hereinafter, referred to as "nonaqueous electrolyte retainability") of holding the nonaqueous electrolyte therein. In addition, because the fiber layer contains PTFE, the strength of the fiber configuring the fiber layer can be enhanced. By setting the content of PVDF and PTFE in the components of the synthetic resin configuring the fiber contained in the fiber layer to be within the above range, both the nonaqueous electrolyte retainability and the strength enhancement of the fiber configuring the fiber layer can be realized simultaneously. Moreover, by using PVDF and PTFE whose molecular weight is within the above range, it is possible to form a homogeneous fiber layer in which the fibers configuring the fiber layer are excellently intertwined with each other.

In the components of the synthetic resin configuring the fiber, the content of PVDF may be equal to or greater than 30% by mass and equal to or less than 80% by mass with respect to the total amount of the components of the synthetic resin. The fiber layer having the aforementioned aspect can simultaneously realize both a high level of nonaqueous electrolyte retainability and a high level of strength enhancement of the fiber configuring the fiber layer.

An average thickness of the fiber layer may be equal to or greater than 0.5 μm and equal to or less than 6 μm. Even in a case where the average thickness is relatively small, the fiber layer can exhibit excellent nonaqueous electrolyte retainability. By setting the average thickness of the fiber layer to be within the above range, a distance between the positive electrode and the negative electrode (interelectrode distance) can be shortened. As a result, the distance that the charge carriers in the nonaqueous electrolyte move between the two electrodes is shortened (that is, the movement of the charge carriers between the two electrodes becomes smooth), and thus the battery resistance can be reduced.

The separator may have a substrate layer made of a resin and a heat resistance layer containing heat resistance fine particles that is formed on the surface of the substrate layer, and the fiber layer may be formed on the surface of the heat resistance layer. By forming the fiber layer on the surface of the separator, the crushing of the pores of the separator can be preferably inhibited. Furthermore, even in a case where the separator is pressed and thus the nonaqueous electrolyte held in the separator is extruded, the nonaqueous electrolyte can be held in the fiber layer. Typically, there are micro-sized projections and recessions on the surface of the heat resistance layer, and hence the fiber configuring the fiber layer is easily entangled in the projections and recessions. Consequently, the surface of the heat resistance layer is suitable for forming the fiber layer.

A second aspect of the invention relates to an assembled battery in which a plurality of unit cells is electrically connected to each other. Each of the unit cells is the nonaqueous electrolyte secondary battery of the first aspect. The unit cells may be confined in a state where a confining pressure of equal to or greater than 0.2 MPa and equal to or less than 10 MPa is applied in a direction orthogonal to a flat surface of the flat roll electrode unit included in each of the unit cells. In the assembled battery configured as above, the roll electrode unit included in each of the unit cells configuring the assembled battery is confined under a predetermined confining pressure. Therefore, when high-rate charge and discharge are repeated, the separator in the electrode unit is easily pressed, and the nonaqueous electrolyte in the electrode unit is easily extruded from the electrode unit. Accordingly, by adopting the nonaqueous electrolyte secondary battery of the first aspect as each of the unit cells (nonaqueous electrolyte secondary batteries) used in the assembled battery, it is possible to provide an assembled battery including unit cells that can exhibit the aforementioned effects of the invention at a high level.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is a perspective view schematically showing an appearance of a nonaqueous electrolyte secondary battery according to an embodiment of the invention;

FIG. 2 is a longitudinal sectional view schematically showing a sectional structure along the line II-II in FIG. 1;

DETAILED DESCRIPTION OF EMBODIMENTS

Figure 3:
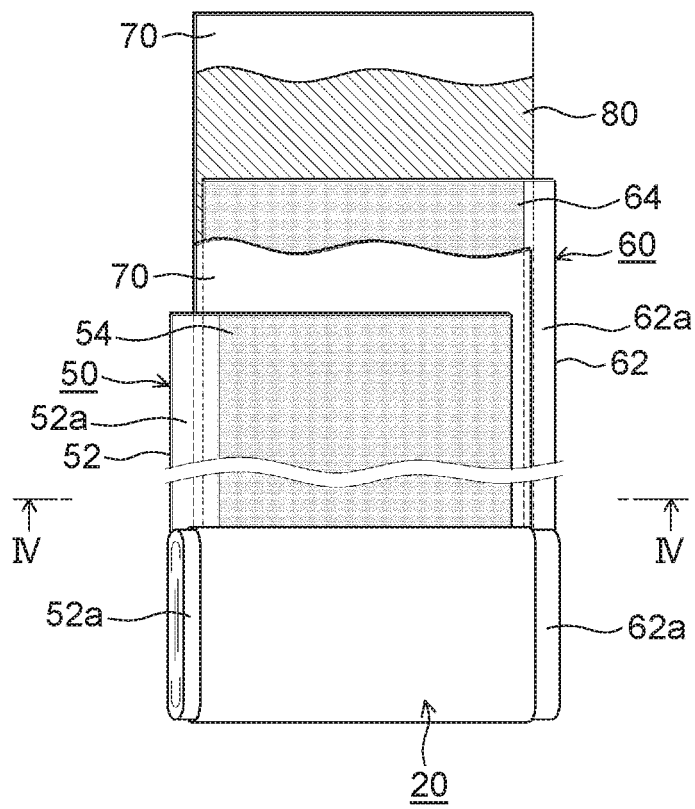
FIG. 3 is a schematic view showing a configuration of a roll-type electrode unit according to the embodiment.

Hereinafter, embodiments of the invention will be described with reference to drawings as appropriate. Herein, matters which are not included in the points particularly described in the invention but which are necessary for embodying the invention can be ascertained as matters of design chosen by those in the related art based on the technique in the field of the related art. The invention can be embodied based on the content disclosed in the present specification and the common technical knowledge in the field of the related art. In the following drawings, in some cases, the members portions that have the same function are described by being marked with the same symbol so as to skip or simplify repetitive description. In addition, the dimensional relationship (length, width, thickness, or the like) in each drawing does not necessarily reflect the actual dimensional relationship. A lithium ion secondary battery is merely an example, and the invention is also applied to other nonaqueous electrolyte secondary batteries (for example, magnesium secondary batteries) including other charge carriers (for example, magnesium ions).

Hereinafter, by mainly illustrating a case where a nonaqueous electrolyte secondary battery (lithium ion secondary battery) having a configuration, in which a roll-type electrode unit and an electrolyte are accommodated in a battery case having an angulated shape, is applied to the invention, an embodiment of the invention will be specifically described. However, the invention is not limited to the embodiment. For example, the roll-type electrode unit is merely an example, and the technical idea of the invention is also applied to other shapes (for example, a laminate-type electrode unit). Furthermore, the shape (appearance or size) of the nonaqueous electrolyte secondary battery is not particularly limited.

Except for having a fiber layer, which will be described later, between a positive electrode and a separator and/or between a negative electrode and a separator, the nonaqueous electrolyte secondary battery of the present embodiment can be configured in the same way as nonaqueous electrolyte secondary batteries of the related art.

As shown in FIGS. 1 and 2, a lithium ion secondary battery 100 has a configuration in which an electrode unit (roll-type electrode unit) 20 is accommodated in a flat box-shaped battery case 30 together with a nonaqueous electrolyte not shown in the drawing. The electrode unit 20 has a shape in which an elongate positive electrode (positive electrode sheet) 50, an elongate negative electrode (negative electrode sheet) 60, and an elongate separator (separator sheet) 70 interposed between those electrodes are wound up flatly.

As shown in FIGS. 1 and 2, the battery case 30 is configured with a case body 32, which has the shape of a box (that is, the shape of a bottomed cuboid) having an opening portion at one end (regarded as being the top portion of a battery used in a normal state), and a lid unit 34 which seals the opening portion of the case body 32. As shown in the drawings, the lid unit 34 is provided with a positive electrode terminal 42 and a negative electrode terminal 44 for external connection. The lid unit 34 is also provided with a safety valve 36 for discharging gas generated inside the battery case 30 out of the battery case and an inlet (not shown in the drawings) for injecting a nonaqueous electrolyte into the battery case. As the material of the battery case 30, for example, a metal material (made of an alloy) such as aluminum, an aluminum alloy, or stainless steel, and a resin material are preferable.

<<Roll-Type Electrode Unit 20>>

Figure 4:
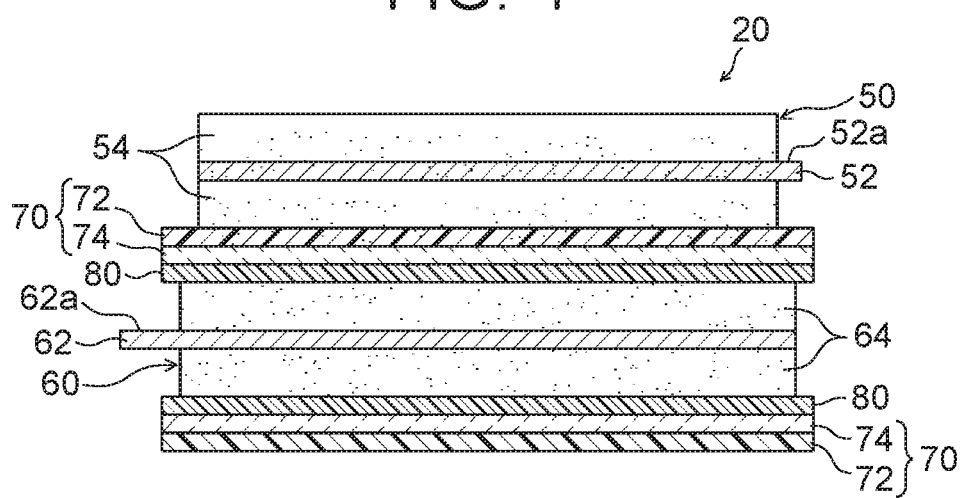
FIG. 4 is a longitudinal sectional view schematically showing a sectional structure along the line IV-IV in FIG. 3, and is a partial sectional view schematically showing a portion between a positive and negative electrode of the roll-type electrode unit according to the embodiment by means of magnification.

As shown in FIGS. 3 and 4, the roll-type electrode unit 20 has a fiber layer 80 between the negative electrode 60 and the separator 70. Hereinafter, as an embodiment of the invention, a nonaqueous electrolyte secondary battery in which the fiber layer is formed on the surface of the separator will be described as an example, but the invention is not limited thereto. The fiber layer 80 may be disposed between the positive electrode 50 and the separator 70 and between the negative electrode 60 and the separator 70. Furthermore, the fiber layer 80 may be disposed only between the positive electrode 50 and the separator 70.

As shown in FIG. 3, at the stage before assembly, the roll-type electrode unit 20 according to the present embodiment has a structure of a long sheet (sheet-like electrode unit). In the roll-type electrode unit 20, the positive electrode (positive electrode sheet) 50, in which a positive electrode active material layer 54 is formed on one surface or both surfaces (herein, both surfaces) of an elongate positive electrode current collector 52 along a longitudinal direction, and the negative electrode (negative electrode sheet) 60, in which a negative electrode active material layer 64 is formed on one surface or both surfaces (herein, both surfaces) of an elongate negative electrode current collector 62 along the longitudinal direction, are superimposed on each other and wound up in the longitudinal direction, together with the elongate separator (separator sheet) 70 on which the fiber layer 80 is formed and which is interposed between the electrodes. The roll-type electrode unit 20 can be flattened by being further pressed and pushed down from the lateral direction after being wound up as above.

As described above, by disposing the separator 70, on which the fiber layer 80 is formed, between the positive electrode 50 (positive electrode active material layer 54) and the negative electrode 60 (negative electrode active material layer 64) and superimposing the electrodes and the separator on each other, the fiber layer 80 can be disposed between the separator 70 and the negative electrode 60. In the drawings, the positive electrode 50, the negative electrode 60, and the separator 70 are superimposed on each other such that the fiber layer 80 formed on one surface of the separator 70 faces the negative electrode active material layer 64. That is, the fiber layer 80 is disposed between the negative electrode 60 (negative electrode active material layer 64) and the separator 70.

In the present embodiment, the fiber layer 80 is disposed between the separator 70 and the positive electrode 50 and between the separator 70 and the negative electrode 60. As a result, the effect of holding the nonaqueous electrolyte extruded from the separator in the fiber layer can be exhibited to a higher degree. Furthermore, a large amount of nonaqueous electrolyte can be held in a portion close to the negative electrode active material layer 64 and the positive electrode active material layer 54, and thus the lack of the nonaqueous electrolyte (typically, liquid shortage) in the negative electrode active material layer 64 and the positive electrode active material layer 54 can be inhibited to a high degree. In addition, it is preferable to dispose the fiber layer 80 as described above, because then the crushing of pores of the separator is inhibited. The electrode unit 20 should be prepared by, for example, forming the fiber layer 80 on both surfaces of the separator 70 and superimposing the separator 70, the positive electrode 50, and the negative electrode 60 on each other.

In the present embodiment, an embodiment in which the fiber layer 80 is formed on the surface of the separator 70 is described as an example. However, as long as the fiber layer 80 is disposed between the separator 70 and the positive electrode 50 and/or between the separator 70 and the negative electrode 60, the invention is not limited to the embodiment. For example, the fiber layer 80 may be formed on the surface (one surface or both surfaces) of the positive electrode 50 (typically, the positive electrode active material layer 54) or on the surface (one surface or both surfaces) of the negative electrode 60 (typically, the negative electrode active material layer 64). For instance, the electrode unit 20, in which the fiber layer 80 is disposed between the separator 70 and the positive electrode 50 and between the separator 70 and the negative electrode 60 as described above, can be prepared by forming the fiber layer 80 on both surfaces of the positive electrode 50 (typically, the positive electrode active material layer 54) and on both surfaces of the negative electrode 60 (typically, the negative electrode active material layer 64) and superimposing the positive electrode 50, the negative electrode 60, and the separator 70 on each other. Alternatively, the long sheet-like fiber layer 80 may be prepared separately, and then the fiber layer 80, the positive electrode 50, the negative electrode 60, and the separator 70 are superimposed on each other such that the fiber layer 80 is disposed between the separator 70 and the positive electrode 50 and/or between the separator 70 and the negative electrode 60.

As shown in FIGS. 2 to 4, in the central portion of the roll-type electrode unit 20 in the direction of the winding axis, a roll core portion (that is, a laminate structure in which the positive electrode active material layer 54 of the positive electrode 50, the negative electrode active material layer 64 of the negative electrode 60, and the separator 70 are laminated to each other) is formed. Furthermore, at both ends of the roll-type electrode unit 20 in the direction of the winding axis, a portion of a positive electrode active material layer non-formation portion 52a and a portion of a negative electrode active material layer non-formation portion 62a protrude from the roll core portion respectively. A positive electrode current collector plate 42a and a negative electrode current collector plate 44a are attached to the protruded portion on the positive electrode side (the positive electrode active material layer non-formation portion 52a) and the protruded portion on the negative electrode side (the negative electrode active material layer non-formation portion 62a) respectively, and are electrically connected to the positive electrode terminal 42 and the negative electrode terminal 44 respectively.

<<Fiber Layer>>

The fiber layer 80 of the present embodiment contains fiber composed of a synthetic resin, and has a mesh shape containing the fiber. Typically, the fiber layer 80 has a large number of pores (voids) (that is, the fiber layer 80 has high void content), and thus the nonaqueous electrolyte can be held in the voids. That is, the fiber layer 80 has excellent nonaqueous electrolyte retainability. As a result, the amount of nonaqueous electrolyte that can be held in the electrode unit 20 having the fiber layer 80 can be increased. Furthermore, because of having high porosity and being excellent in the permeability of the nonaqueous electrolyte, the fiber layer 80 is easily impregnated with the nonaqueous electrolyte. Consequently, because of having such a fiber layer 80 in the electrode unit 20, the electrode unit 20 can be smoothly impregnated with the nonaqueous electrolyte. Especially, in the roll-type electrode unit 20, the inlet of electrolyte (end of the roll-type electrode unit 20 in the permeation direction) is particularly easily narrowed relative to the area of the electrodes, and thus the electrode unit is easily unevenly impregnated with the nonaqueous electrolyte. Therefore, it is particularly effective for the electrode unit 20 to have the fiber layer 80 such that the electrode unit 20 is efficiently impregnated with the nonaqueous electrolyte. Typically, the fiber layer 80 is a structure formed by three-dimensionally assembling fibers by means of weaving, knitting, laminating, and the like.

The fiber layer 80 may be in the form of woven cloth or nonwoven cloth. For example, the nonwoven cloth-like fiber layer 80 may be in the form of nonwoven cloth obtained by molding and integrating fibers in the form of a sheet without weaving the fibers. Typically, the nonwoven cloth-like fiber layer 80 is configured with fibers laminated to each other. In the nonwoven cloth-like fiber layer 80, for example, the fibers may integrally form a sheet shape by being intertwined with each other without being bonded to each other, may be directly bonded to each other in an intersection point, or may be bonded to each other through a binder in an intersection point. The woven cloth-like fiber layer 80 can be in the form of woven cloth obtained by weaving fibers in the form of a sheet (cloth), for example. The cloth structure of the woven cloth-like fiber layer 80 is not particularly limited. For example, various structures such as plain weave, twill weave, and satin weave may be adopted, and the diameter of the fiber used or the aperture can be arbitrarily set. Herein, the woven cloth which is woven such that the weaving line makes a great curve in the thickness direction (that is, the three-dimensionally woven cloth) can reduce air permeability in the plane direction. In the present embodiment, as the fiber layer 80, the nonwoven cloth-like fiber layer will be described for example.

The fiber layer 80 contains at least PVDF and PTFE as the components of the synthetic resin configuring the fiber contained in the fiber layer 80. Typically, the fiber can be configured with mixed material including PVDF and PTFE. PVDF is excellent in the nonaqueous electrolyte retainability. Therefore, if the fiber contains PVDF, electrolyte retainability of the fiber layer can be improved. Furthermore, PTFE is excellent in mechanical strength. Accordingly, if the fiber contains PTFE, the strength (shape retainability) of the fiber layer can be improved. That is, the fiber layer 80 which contains the fiber configured with at least PVDF and PTFE as the components of the synthetic resin is excellent in the nonaqueous electrolyte retainability and is not easily crushed. Both the PVDF and the PTFE contained in the fiber have an average molecular weight (number average molecular weight: Mn) of equal to or greater than 200,000 and equal to or less than 2,000,000. If the average molecular weight of PVDF and PTFE is too small, the intertwinement of the fibers easily becomes poor, and thus the moldablity of the fiber layer 80 may deteriorate. In contrast, if the average molecular weight of PVDF and PTFE is too great, the fibers are easily and excessively intertwined with each other, and accordingly, it is difficult to form the fiber layer 80 having homogeneous properties (typically, average thickness, pore distribution, and the like) in some cases.

In the components of the synthetic resin configuring the fiber, the content of PTFE can be equal to or less than 45% by mass with respect to the total amount of the components of the synthetic resin. For example, the content of PTFE can be equal to or greater than 10% by mass (typically, equal to or greater than 20% by mass) and equal to or less than 45% by mass (typically, equal to or less than 30% by mass). If the content of PTFE in the fiber configuring the fiber layer 80 is too small, the strength (shape retainability) of the fiber layer 80 is reduced, and thus the fiber layer 80 is easily crushed. As a result, it is difficult to hold a sufficient amount of nonaqueous electrolyte in the fiber layer 80 in some cases. In contrast, if the content of PTFE in the fiber is too great, the moldability of the fiber layer 80 deteriorates, and accordingly, it is difficult to form the fiber layer having homogeneous properties (for example, average thickness, pore distribution, and the like) in some cases. In the components of the synthetic resin configuring the fiber, the content of PVDF is greater than the content of PTFE among the synthetic resin components. For example, in the components of the synthetic resin configuring the fiber, the content of PVDF is preferably equal to or greater than 30% by mass (for example, equal to or greater than 50% by mass) and equal to or less than 80% by mass (for example, equal to or less than 70% by mass), with respect to the total amount of the components of the synthetic resin. By setting the content of PVDF with respect to the total amount of the components of the synthetic resin configuring the fiber layer to be within the above range, a fiber layer 80 having homogeneous properties (typically, average thickness, pore distribution, and the like) can be formed. If the content of PVDF in the fiber configuring the fiber layer 80 is too small, the nonaqueous electrolyte retainability resulting from PVDF may not be sufficiently exhibited, and thus the electrolyte retainability of the fiber layer 80 may deteriorate. In contrast, if the content of PVDF in the fiber is too great, the fiber layer 80 may hold an excess of nonaqueous electrolyte while the positive electrode 50 (typically, the positive electrode active material layer 54) and the negative electrode 60 (typically, the negative electrode active material layer 64) lack the nonaqueous electrolyte. The total content of PVDF and PTFE in the components of the synthetic resin configuring the fiber is preferably equal to or greater than 50% by mass (more preferably equal to or greater than 55% by mass, even more preferably equal to or greater than 70% by mass, and still more preferably equal to or greater than 75% by mass) with respect to the total amount of the components of the synthetic resin. The fiber configuring the fiber layer 80 can substantially contain only PVDF and PTFE as the components of the synthetic resin.

As long as the effects of the invention are not markedly impaired, the fiber configuring the fiber layer 80 can contain one kind or two or more kinds of other components of the synthetic resin in addition to PVDF and PTFE. Such components of the synthetic resin are not particularly limited, and examples thereof include a fluorine resin such as polyvinyl fluoride (PVF) or a perfluoroethylene propene copolymer (FEP); a polyolefin resin such as polyethylene or polypropylene; a polyester resin such as polyethylene terephthalate; an acryl resin such as polymethyl methacrylate (PMMA); a polyamide resin such as nylon; a polyimide resin; a vinyl resin such as polyvinyl chloride; a styrene resin such as polystyrene; a carbonate resin such as polycarbonate; and the like. In a case where the fiber layer 80 contains components of the synthetic resin other than PVDF and PTFE as the components of the synthetic resin configuring the fiber, the proportion of the components of the synthetic resin other than PVDF and PTFE in the components of the synthetic resin configuring the fiber layer is preferably, for example, equal to or less than 45% by mass (more preferably equal to or less than 30% by mass, even more preferably equal to or less than 25% by mass, and still more preferably equal to or less than 10% by mass) with respect to the total amount of the components of the synthetic resin.

Typically, the fiber configuring the fiber layer is preferably fiber composed solely of the components of the synthetic resin described above. However, if necessary, the fiber may contain one kind of material or two or more kinds of materials in addition to the components of the synthetic resin. Examples of such materials include various additives such as a stabilizer called an oxidation stabilizer and a modifier called a plasticizer or a lubricant. Alternatively, for the purpose of securing the strength of the fiber layer 80, the fiber may further contain glass, ceramics, an inorganic material represented by an inorganic carbon material, a metal material represented by copper or steel, and the like. In a case where the fiber contains components other than the components of the synthetic resin, the proportion of the components other than the components of the synthetic resin in the fiber is preferably, for example, equal to or greater than 0.01% by mass (generally, equal to or greater than 0.05% by mass) and equal to or less than 1% by mass (generally, equal to or less than 0.5% by mass) with respect to the total amount of the fiber. In a preferred aspect, the proportion of the components of the synthetic resin (PVDF, PTFE, and other components of a synthetic resin) contained in the fiber is about equal to or greater than 90% by mass (for example, equal to or greater than 95% by mass) with respect to the total amount of the fiber. The fiber configuring the fiber layer 80 can be fiber that is substantially configured solely with the synthetic resin components described above.

The diameter of the fiber is not particularly limited. However, if fine fiber is used, a surface area of the fiber can be increased, and hence a contact area between the fiber configuring the fiber layer 80 and the nonaqueous electrolyte can be increased. As a result, the leakage of the nonaqueous electrolyte held in the fiber layer 80 can be suppressed. Furthermore, if fine fiber is used, the fiber layer 80 having more pores (that is, the fiber layer 80 with a great void content) can be prepared, and accordingly, the amount of the nonaqueous electrolyte that can be held in the fiber layer 80 can be increased (that is, the electrolyte retainability of the fiber layer 80 can be improved). From the viewpoint of preparing a thinner fiber layer 80, fiber having a small diameter is preferable. Therefore, the fiber diameter is preferably, for example, equal to or less than 200 nm (more preferably equal to or less than 150 nm) on average. The lower limit of the fiber diameter is not particularly limited. However, if the fiber diameter is too small, the dynamic strength of the fiber layer 80 may be reduced. In addition, fiber having an excessively small diameter is easily broken, and thus the formation of the fiber layer 80 becomes difficult in some cases. Accordingly, the fiber diameter is preferably, for example, equal to or greater than 50 nm on average. Generally, the fiber can have a fiber diameter of about 100 nm.

The length of the fiber is not particularly limited. However, if long fibers are used, the fibers are excellently intertwined with each other, and thus the fiber layer 80 that has high dynamic strength and is not easily crushed can be formed. Therefore, the fiber length is preferably equal to or greater than 10 mm, more preferably equal to or greater than 100 mm, and even more preferably equal to or greater than 500 mm on average.

If necessary, the fiber layer 80 can contain materials other than the fiber composed of the aforementioned synthetic resin (that is, the fiber containing at least PTFE and PVDF as the components of the synthetic resin). For example, the fiber layer 80 can contain a binder bonding the fibers to each other and the like. Alternatively, the fiber may be used in combination with fibers other than the fiber composed of the components of the synthetic resin, such as fiber composed of conductive materials like carbon nanotubes or whiskers and ceramic fibers composed of silica, alumina, or aluminosilicate. In a case where the fiber layer 80 contains materials other than the fiber composed of the synthetic resin (that is, the fiber containing at least PTFE and PVDF as the components of the synthetic resin), the proportion of the materials other than the fiber composed of the synthetic resin in the entirety of the fiber layer 80 is preferably, for example, equal to or greater than 0.01% by mass (generally, equal to or greater than 0.05% by mass) and equal to or less than 1% by mass (generally, equal to or less than 0.5% by mass). In a preferred aspect, the content of the fiber composed of the synthetic resin (that is, the fiber containing at least PTFE and PVDF as the components of the synthetic resin) in the fiber layer 80 is about equal to or greater than 90% by mass (for example, equal to or greater than 95% by mass) of the entirety of the fiber layer 80. The fiber layer 80 can be a fiber layer substantially configured with solely the fiber containing at least PVDF and PTFE.

The average thickness of the fiber layer 80 is not particularly limited. However, if the average thickness of the fiber layer 80 is too great, the energy density of the battery is reduced. Therefore, it is preferable that the average thickness of the fiber layer 80 is small. The average thickness of the fiber layer 80 can be, for example, equal to or less than 6 µm (preferably equal to or less than 3 µm and more preferably equal to or less than 2 µm). In contrast, it is difficult to prepare a fiber layer 80 having an extremely small average thickness, and the thickness, porosity, and the like easily become heterogeneous. Accordingly, the average thickness of the fiber layer 80 can be, for example, equal to or greater than 0.5 µm. The average thickness of the fiber layer 80 can be determined by, for example, the analysis of a sectional SEM image or the like.

From the viewpoint of supplying the nonaqueous electrolyte held in the fiber layer 80 to the positive electrode active material layer 54 and the negative electrode active material layer 64 so as to use the nonaqueous electrolyte in a battery reaction, it is preferable that the fiber layer 80 has such a size that the fiber layer 80 covers at least a portion where the positive electrode active material layer 54 and the negative electrode active material layer 64 face each other at the time of establishing the electrode unit. For example, the length of the fiber layer 80 in the width direction orthogonal to the longitudinal direction is preferably greater than the length of the positive electrode active material layer 54 in the width direction orthogonal to the longitudinal direction (preferably greater than the length of the negative electrode active material layer 64 in a direction orthogonal to the longitudinal direction). Particularly, the length of the fiber layer 80 in the width direction is preferably the same as the length of the separator 70 in the width direction orthogonal to the longitudinal direction (more preferably, the size of the fiber layer 80 is the same as that of the separator 70). If the fiber layer 80 has a size described above, the nonaqueous electrolyte extruded from the separator 70 can be preferably held in the fiber layer 80.

The method for preparing the fiber layer 80 is not particularly limited, and the fiber layer 80 should be prepared by a method known in the related art. Preferred examples of the method for preparing the nonwoven cloth-like fiber layer 80 include an electrospinning method (also referred to as an electric field spinning method or an electrostatic spinning method). In brief, the electro spinning method is a method in which high voltage is applied to a solution-like spinning material (typically, a polymer solution) in a spinning nozzle, and the spinning material charged in the aforementioned manner is sprayed from the spinning nozzle so as to spin fiber. By collecting the fiber into a collector (referred to as a counter electrode or a collector electrode substrate as well), nonwoven cloth can be prepared. For example, by dissolving (melting) the components of the synthetic resin contained in the fiber and materials, which are used if necessary, in an appropriate solvent (for example, NMP or the like), a solution-like composition for forming a fiber layer is prepared, and by the electrospinning method, fiber is prepared (spun) from the composition. Thereafter, the obtained fiber is collected by being laminated in the form of a sheet onto the surface of the separator 70 (alternatively, the positive electrode 50 or the negative electrode 60) loaded on the collector, and in this way, the nonwoven cloth-like fiber layer 80 can be formed on the surface of the separator 70 (alternatively, the positive electrode 50 or the negative electrode 60). If necessary, by performing a rolling treatment (pressing treatment), the properties (average thickness, void content, and basis weight) of the fiber layer 80 can be adjusted. It is preferable that the fiber layer 80 is formed on the entire surface of the separator 70 (alternatively, the positive electrode 50 or the negative electrode 60), that is, on the separator 70 (alternatively, the positive electrode 50 or the negative electrode 60) in all of the longitudinal and width directions thereof.

With the electrospinning method described above, the fiber layer 80 can be formed directly on the surface of the separator 70 (alternatively, the positive electrode 50 or the negative electrode 60). Furthermore, with the electrospinning method, it is possible to easily prepare fiber (typically, nanofiber) having an extremely small diameter that is about several nanometers to submicrometers. Accordingly, the electrospinning method is preferable. In addition, with the electrospinning method, not only the fiber diameter but also the shape of the fiber, the mixing ratio between the components of the synthetic resin in the fiber (for example, the mixing ratio between PVDF and PTFE in the components of the synthetic resin configuring the fiber), the orientation of the fiber in the fiber layer, and the like can be relatively easily adjusted. Moreover, the electrospinning method is suitable for preparing the fiber layer 80 having a small average thickness or the fiber layer 80 having many pores (having high porosity).

<<Positive Electrode>>

As the positive electrode current collector 52 configuring the positive electrode 50, a conductive material composed of a metal having excellent conductivity (for example, aluminum, nickel, titanium, stainless steel, or the like) can be preferably adopted. The positive electrode active material layer 54 contains at least a positive electrode active material. As the positive electrode active material, for example, it is possible to preferably use a lithium composite metal oxide having a lamellar structure or a spinel structure (for example, $LiNi_{1/3}Co_{1/3}Mn_{1/3}O_2$, $LiNiO_2$, $LiCoO_2$, $LiFeO_2$, $LiMn_2O_4$, $LiNi_{0.5}Mn_{1.5}O_4$, $LiFePO_4$, or the like). The positive electrode active material layer 54 can contain a component other than the active material, for example, a conductive material, a binder, or the like. As the conductive material, carbon black such as acetylene black (AB) or other carbon materials (graphite and the like) can be preferably used. As the binder, PVDF or the like can be used.

<<Negative Electrode>>

As the negative electrode current collector 62 configuring the negative electrode 60, a conductive material composed of metal having excellent conductivity (for example, copper, nickel, titanium, stainless steel, or the like) can be preferably adopted. The negative electrode active material layer 64 contains at least a negative electrode active material. As the negative electrode active material, for example, a carbon material such as graphite, hard carbon, or soft carbon can be used. The surface of the carbon material (carbon material that becomes a core) may be coated with an amorphous carbon film. The negative electrode active material layer 64 can contain a component other than the active material, for example, a binder, a thickener, or the like. As the binder, styrene butadiene rubber (SBR) or the like can be used. As the thickener, for example, carboxymethyl cellulose (CMC) or the like can be used.

<<Separator>>

The separator 70 can be a separator composed solely of a separator substrate 72 made of a resin. Alternatively, the separator 70 may be a heat resistance separator obtained by providing a porous heat resistance layer 74 on one surface or both surfaces (typically, one surface) of the separator substrate (substrate layer) 72 made of a resin. The heat resistance layer 74 can be a layer formed on the entire surface of the substrate layer 72, that is, a layer formed on the substrate layer 72 in all of the longitudinal and width directions thereof.

Preferred examples of the separator substrate configuring the substrate layer 72 include a porous resin sheet composed of a resin such as polyethylene (PE), polypropylene (PP), polyester, cellulose, or polyamide. Among these, a polyolefin-based porous resin (for example, PE or PP) has a shutdown temperature of 80° C. to 140° C. (typically, 110° C. to 140° C., and for example, 120° C. to 135° C.) that is sufficiently lower than the heatproof temperature of the battery (typically, approximately a temperature of equal to or higher than 200° C.). Therefore, such a resin can perform the shutdown function at an appropriate timing.

The separator substrate (substrate layer) 72 may have a single layer structure composed of one kind of porous resin or a structure in which two or more porous resin sheets composed of different materials or having different properties (thickness, void content, and the like) are laminated to each other. As the separator substrate 72 having a multilayer structure, for example, those having a double layer structure in which PE and PP are laminated to each other or a triple layer structure in which a polypropylene (PP) layer is laminated on both surfaces of a polyethylene (PE) layer (that is, a triple layer structure consisting of PP/PE/PP) can be preferably adopted.

For example, even in a case where the internal temperature of the battery is increased (for example, a temperature of equal to or higher than 150° C., and typically, a temperature of equal to or higher than 200° C.) due to internal short circuit or the like, the heat resistance layer 74 can have properties of being able to retain its shape without being softened or melted (slight deformation is acceptable). The heat resistance layer 74 contains, for example, heat resistance fine particles and a binder. The heat resistance fine particles can be an organic filler, an inorganic filler, and the like that are used as a filler in the heat resistance layer 74 of the separator of the nonaqueous electrolyte secondary battery. Considering the heat resistance, durability, dispersibility, stability, and the like, it is preferable to use the inorganic filler.

Examples of the inorganic filler contained in the heat resistance layer 74 include metal oxide, metal hydroxide, and the like. For example, it is possible to preferably adopt alumina, boehmite, silica, titania, calcia, magnesia, zirconia, boron nitride, aluminum nitride, and the like. These compounds have a high melting point and excellent heat resistance. Furthermore, the Mohs hardness thereof is relatively high, and the durability (mechanical strength) thereof is also excellent. In addition, because these compounds are relatively cheap, the raw material cost can be reduced. Particularly, among metals, aluminum has a relatively small specific gravity, and hence it can lighten the weight of the battery. One kind of these inorganic fibers can be used singly, or two or more kinds thereof can be used in combination.

The shape of the fillers is not particularly limited and can be, for example, a granular shape, a fibrous shape, a plate shape (flake shape), or the like. The average particle size of the filler is not particularly limited. However, considering the dispersibility or the like, it is appropriate to set the average particle size of the filler to be equal to or greater than 0.01 μm (for example, equal to or greater than 0.05 μm, typically 0.1 μm, and particularly 0.2 μm) and equal to or less than 5 μm (for example, equal to or less than 3 μm, typically equal to or less than 2 μm, and particularly equal to or less than 1.8 μm). If the particle size of the filler is within the above range, the adhesiveness of the heat resistance layer 74 with respect to the substrate layer 72, the porosity of the heat resistance layer 74, and the air permeability of the separator 70 can be adjusted within a preferred range. In the present specification, the average particle size of the filler refers to a particle size ($D_{50}$ particle size, referred to as a median diameter as well) corresponding to a cumulative 50% by volume from fine particle side in the volume-based particle size distribution measured based on particle size distribution analysis by a general laser diffraction-light scattering method. The particle size of the inorganic filler can be adjusted by, for example, a technique of pulverizing, sieving, or the like.

The specific surface area of the filler is not particularly limited. However, it is preferably about equal to or greater than 1 $m^2/g$ (for example, equal to or greater than 1.5 $m^2/g$ and typically equal to or greater than 2 $m^2/g$) and equal to or less than 100 $m^2/g$ (for example, equal to or less than 50 $m^2/g$ and typically equal to or less than 20 $m^2/g$). If the specific surface area of the filler is within the above range, the porosity of the heat resistance layer 74 and the air permeability of the separator 70 can be adjusted within a preferred range. Herein, as the "specific surface area", a general BET specific surface area is adopted.

As the binder contained in the heat resistance layer 74, for example, an acrylic resin, polytetrafluoroethylene (PTFE), polyvinylidene fluoride (PVDF), carboxymethyl cellulose (CMC), methyl cellulose (MC), and the like can be preferably used. One kind of these binders can be used singly, or two or more kinds thereof can be used in combination. Particularly, the acrylic resin exhibits strong adhesiveness (typically, initial tack and adhesion strength) and is electrochemically stable. Therefore, the acrylic resin is preferable because it can exhibit a high degree of shape retainability. If necessary, in addition to the aforementioned filler and binder, the heat resistance layer 74 can also contain one kind of material or two or more kinds of materials that can be used as components configuring the heat resistance layer 74 in a general secondary battery. Examples of such materials include various additives such as a thickener, a dispersing agent, and the like.

It is appropriate for the proportion of the filler contained in the entirety of the heat resistance layer 74 to be about equal to or greater than 30% by mass. Generally, the proportion of the filler can be equal to or greater than 40% by mass (for example, equal to or greater than 50% by mass) and equal to or less than 97% by mass (for example, equal to or less than 90% by mass). The proportion of the binder contained in the entirety of the heat resistance layer 74 can be about, for example, equal to or greater than 3% by mass (typically, equal to or greater than 10% by mass) and equal to or less than 70% by mass (typically, equal to or less than 50% by mass). If the amount of the binder contained in the entirety of the heat resistance layer 74 is within the above range, the adhesion (typically, peel strength) between the substrate layer 72 and the heat resistance layer 74 can be improved. As a result, for example, even in a case where the separator substrate (substrate layer 72) is exposed to a high temperature environment in which thermal contraction can occur, the peeling of the heat resistance layer 74 from the substrate layer 72 can be inhibited, and the thermal contraction of the separator 70 can also be inhibited. That is, the separator 70 having excellent heat resistance can be provided, and thus the reliability of the battery using the separator 70 can be improved. For example, a mass ratio (NV-based, that is, expressed in terms of solid content) between the filler and the binder contained in the heat resistance layer 74 (filler:binder) can be 30:70 to 97:3 (for example, 40:60 to 90:10). If the ratio of the binder to the filler is too low, the anchoring properties of the heat resistance layer 74 or the strength (shape retainability) of the heat resistance layer deteriorates, and thus a problem such as cracking or exfoliating occurs in some cases. If the ratio of the binder to the filler is too high, the porosity of the heat resistance layer 74 or the ion permeability of the separator 70 deteriorates in some cases. In a preferred aspect, the total content of the filler and the binder is about equal to or greater than 90% by mass (for example, equal to or greater than 95% by mass) with respect to the total mass (expressed in terms of solid content) of the heat resistance layer 74. The heat resistance layer 74 may be a heat resistance layer substantially configured solely with the filler and the binder.

Generally, the average thickness of the separator substrate (substrate layer) 72 is preferably equal to or greater than 5 μm (typically, equal to or greater than 10 μm, and for example, equal to or greater than 17 μm) and equal to or less than 40 μm (typically, equal to or less than 30 μm, and for example, equal to or less than 25 μm). If the thickness of the substrate layer 72 is within the above range, the aforementioned insulation function or the electrolyte retainability can be preferably exhibited, and the ion permeability can be better maintained. As a result, excellent battery performance can be exhibited. The average thickness of the heat resistance layer 74 can be, for example, equal to or greater than 1 μm (typically, equal to or greater than 3 μm) and equal to or less than 10 μm (typically, equal to or less than 5 μm). If the thickness of the heat resistance layer 74 is within the above range, the durability of the separator 70 can be improved, and hence a high level of a short circuit prevention effect can be realized. The thickness of the substrate 72 and the thickness of the heat resistance layer 74 can be determined by the measurement using a micrometer or a thickness meter or by the analysis of a sectional SEM image or the like.

The porosity (void content) of the separator substrate (substrate layer) 72 is not particularly limited. However, generally, the porosity of the substrate layer 72 is preferably about 20% by volume to 70% by volume, and is more preferably about, for example, 30% by volume to 60% by volume. If the porosity of the substrate layer 72 is too great, the mechanical strength become insufficient, and thus thermal contraction markedly occurs in some cases. In contrast, if the porosity is too small, the amount of nonaqueous electrolytes that can be held in the substrate layer 72 is reduced, and thus the charge and discharge characteristics tend to deteriorate in some cases. The porosity of the substrate layer 72 can be adjusted by, for example, the type of the material configuring the substrate layer 72, the strength thereof at the time of stretching, and the like. The porosity (void content) of the heat resistance layer 74 can be, for example, equal to or greater than 50% by volume and equal to or less than 70% by volume. If the porosity of the heat resistance layer 74 is too great, the mechanical strength becomes insufficient in some cases. In contrast, if the porosity is too small, the ion permeability deteriorates, and thus the increase of resistance or the deterioration of input and output characteristics occurs in some cases. The porosity of the heat resistance layer 74 can be adjusted by, for example, the shape of the filler (for example, the average particle size), the content of the binder, and the like. Therefore, by setting the porosity of the substrate layer 72 and the porosity of the heat resistance layer 74 to be within the above range, high strength and excellent insulation properties can be exhibited, and the battery performance (for example, ion permeability and input and output characteristics) can be improved.

The porosity of the separator substrate (substrate layer) 72 and the porosity of the heat resistance layer 74 can be calculated from a mass W (g), an apparent volume V ($cm^3$), and a true density ρ ($g/cm^3$) by an equation of $[1-(W/\rho V)] \times 100$. The "apparent volume" can be calculated by a product of an area ($cm^2$) in plan view and a thickness (cm). The "true density ρ" can be measured by a density measuring device using a general fixed volume expansion method (gas displacement-type pycnometer method) or the like.

The air permeability (Gurley number) of the separator 70 is preferably, for example, a value which is greater than 6 sec (more preferably equal to or greater than 10 sec) and equal to or less than 350 sec (more preferably equal to or less than 240 sec). The air permeability is a value specifying the average pore diameter by simulation. If the air permeability is too small, the ion permeability deteriorates, and thus the input and output characteristics may tend to deteriorate in some cases. In a case where the fiber layer 80 is formed on the separator 70, if the air permeability is too small, an excess of fiber configuring the fiber layer 80 is put into the pores of the separator 70, and thus the ion permeability or the input and output characteristics may tend to deteriorate in some cases. In contrast, if the air permeability of the separator 70 is too great, for example, in a case where the fiber layer 80 is formed on the separator 70, the adhesiveness between the separator 70 and the fiber layer 80 deteriorates. This is not preferable because peeling easily occurs between the separator 70 and the fiber layer 80. Herein, the "air permeability" refers to a degree of resistance to air permeation (Gurley second) measured by a Gurley test method, and is a time (sec) taken for 100 mL air to permeate the separator that is measured by a predetermined method. The air permeability can be measured by the method specified in JIS P8117 (2009).

As two sheets of the separators 70 included in the roll-type electrode unit 20, separators composed of different materials and having different properties (that is, the configurations of the substrate layer 72 and the heat resistance layer 74) may be adopted. In a case where the heat resistance layer 74 is formed on both surfaces of the substrate layer 72, the surface of the heat resistance layer 74 facing the positive electrode 50 and the surface of the other heat resistance layer 74 facing the negative electrode 60 may have the same properties, and for example, the type or proportion of the filler contained in the heat resistance layer 74, the void content, the average thickness, and the like may be different. Furthermore, in a case where the heat resistance layer 74 is formed on only one surface of the substrate layer 72, the heat resistance layer 74 may be caused to face either the positive electrode 50 (positive electrode active material layer 54) or the negative electrode 60 (negative electrode active material layer 64).

In a case where the fiber layer 80 is formed on the surface of the separator 70, the fiber layer 80 may be formed on either the surface of the substrate layer 72 or the surface of the heat resistance layer 74. The projections and recessions on the surface of the heat resistance layer 74 are larger than those of the substrate layer 72, and thus the fiber configuring the fiber layer 80 easily becomes entangled in the heat resistance layer 74. Therefore, compared to the substrate layer 72, the heat resistance layer 74 is more preferable as the surface for forming the fiber layer 80.

<<Nonaqueous Electrolyte>>

Typically, as the nonaqueous electrolyte, an electrolyte obtained by adding a supporting salt to an appropriate nonaqueous solvent (typically, an organic solvent) can be used.

As the nonaqueous solvent, various organic solvents used in general nonaqueous electrolyte secondary batteries can be used without particular limitation. For example, nonprotonic solvents such as carbonates, ethers, esters, nitriles, sulfones, and lactones can be used without particular limitation. Among these, carbonates such as ethylene carbonate (EC), diethyl carbonate (DEC), dimethyl carbonate (DMC), ethyl methyl carbonate (EMC), and propylene carbonate (PC) can be preferably adopted.

As the supporting salt, for example, lithium salts such as $LiPF_6$, $LiClO_4$, $LiAsF_6$, $Li(CF_3SO_2)_2N$, $LiBF_4$, and $LiCF_3SO_3$ can be preferably adopted. One kind of the supporting salt can be used singly, or two or more kinds thereof can be used in combination. Particularly, $LiPF_6$ is preferable. Therefore, the concentration of the supporting salt is preferably, for example, equal to or greater than 0.1 mol/L (for example, equal to or greater than 0.8 mol/L) and equal to or less than 2 mol/L (for example, equal to or less than 1.5 mol/L). The concentration of the supporting salt is preferably 1.1 mol/L.

As long as the effects of the invention are not markedly impaired, the nonaqueous electrolyte can contain components other than the nonaqueous solvent and the supporting salt. Those optional components are used for one purpose or two or more purposes such as the improvement of the output performance of the battery, the improvement of the storability (such as inhibition of capacity reduction during storage), the improvement of cycle characteristics, and the improvement of initial charge and discharge efficiency. Examples of preferred additives include various additives like a gas generator such as biphenyl (BP) or cyclohexylbenzene (CHB); a coating film forming agent such as an oxalate complex compound having a boron atom and/or a phosphorus atom (for example, lithium bisoxalate borate ($LiBF_2(C_2O_4)$), lithium difluorobisoxalate phosphate ($LiPF_2(C_2O_4)_2$, or the like), vinylene carbonate (VC), vinylethylene carbonate (VEC), fluoroethylene carbonate (FEC), ethylene sulfite (ES), propanesultone (PS), or lithium bis(trifluoromethanesulfonyl)imide (LiTFSI); a dispersing agent; and a thickener. One kind of the additive may be used singly, or two or more kinds thereof may be used in combination as appropriate.

Figure 5:
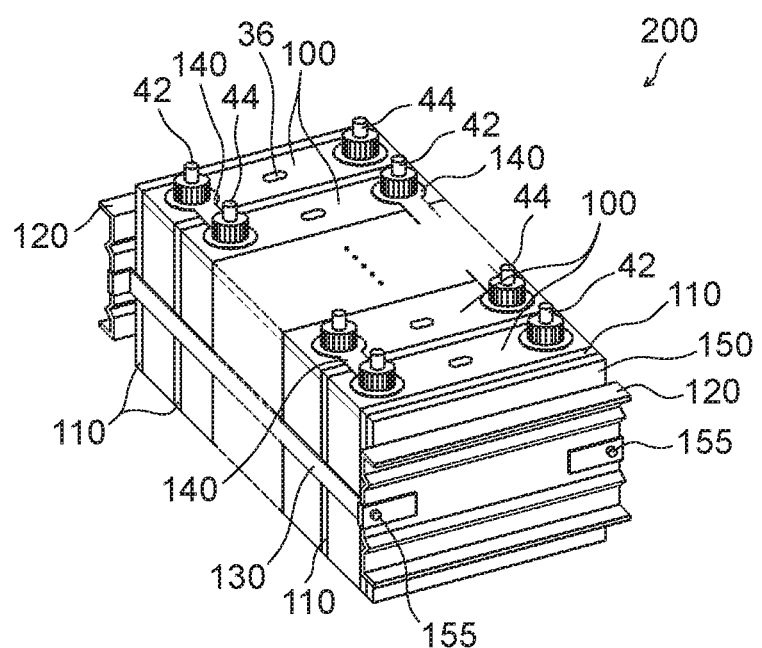
FIG. 5 is a perspective view schematically showing an assembled battery in which a plurality of nonaqueous electrolyte secondary batteries according to the embodiment of the invention is assembled with each other.

Next, an example of an assembled battery (typically, an assembled battery in which a plurality of unit cells is connected to each other in series) 200 which includes a plurality of lithium ion batteries 100 described above used as cell units will be described. As shown in FIG. 5, in the assembled battery 200, in a state of being inverse to each other such that the positive electrode terminal 42 and the negative electrode terminal 44 are alternately arranged, a plurality of lithium ion secondary batteries (unit cells) 100 (typically, 10 or more lithium ion secondary batteries 100, preferably about 10 to 30 lithium ion secondary batteries 100, and for example, 20 lithium ion secondary batteries 100) is arranged in a direction in which wide surfaces of the battery case 30 face each other, that is, in a direction in which the flat surfaces of the flat roll-type electrode unit in the battery case face each other. Between the unit cells 100 arranged as above, a cooling plate 110 having a predetermined shape is interposed. The cooling plate 110 functions as a radiating member for efficiently scattering heat generated inside each of the unit cells 100 at the time of use. It is preferable that the cooling plate 110 has a shape (for example, a shape in which a plurality of parallel grooves that vertically extend from one side of the rectangular cooling plate and reaches the other side facing the one side is provided on the surface of the cooling plate) which enables a cooling fluid (typically, air) to be introduced into a portion between the unit cells 100. The cooling plate is preferably made of a metal having excellent heat conductivity, lightweight and hard polypropylene, or other synthetic resins.

At both ends of the unit cells 100 and the cooling plates 110 arranged as above, a pair of end plates (confining plates) 120 are disposed. Furthermore, between the cooling plate 110 and the end plate 120, one spacer member 150 or a plurality of spacer members 150 that functions as long means for adjusting length and has the shape of a sheet may be interposed. By a confining band 130 for fastening that is mounted on the assembled battery so as to function as a bridge between both of the end plates 120, the unit cells 100, the cooling plates 110, and the spacer members 150 arranged as above are confined such that a predetermined confining pressure is applied in the arrangement direction of the unit cells. That is, the unit cells are confined such that the confining pressure is applied in a direction orthogonal to the flat surface of the flat roll-type electrode unit included in the unit cells. More specifically, by screws 155, the end of the confining band 130 is fastened and fixed to the end plates 120, and in this way, the unit cells and the like are confined such that a predetermined confining pressure is applied to the arrangement direction thereof. Furthermore, between the unit cells 100 adjacent to each other, the positive electrode terminal 42 of one unit cell 100 and the negative electrode terminal 44 of the other unit cell 100 are electrically connected to each other by a connection member (busbar) 140. By connecting the respective unit cells 100 in series as described above, the assembled battery 200 having an intended voltage is established.

The confining pressure that confines the respective unit cells is not particularly limited. However, it is preferable to set the confining pressure such that a confining pressure of equal to or greater than 0.2 MPa and equal to or less than 10 MPa is applied in a direction (that is, the arrangement direction of the unit cells) orthogonal to the flat surface (flat portion) of the roll-type electrode unit 20 included in the unit cells.

The nonaqueous electrolyte secondary battery of the present embodiment is a secondary battery in which the occurrence of variation in the amount of the nonaqueous electrolyte in the electrode unit that results from the repetition of high-rate charge and discharge is inhibited, even in a case where the battery is used in applications in which high-rate charge and discharge are repeated. Therefore, the nonaqueous electrolyte secondary battery has excellent high-rate charge and discharge characteristics. Consequently, by making the most of such characteristics, the nonaqueous electrolyte secondary battery of the present embodiment can be used as a power supply for driving mounted on vehicles such as a plug-in hybrid vehicle (PHV), a hybrid vehicle (HV), and an electric vehicle (EV). Furthermore, according to the invention, it is possible to provide a vehicle including the nonaqueous electrolyte secondary battery of the present embodiment as a power source (typically, an assembled battery in which a plurality of secondary batteries is electrically connected to each other).

Hereinafter, examples (test examples) relating to the invention will be described, but the invention is not limited to the examples (test examples).

By the following materials and process, lithium ion secondary batteries (nonaqueous electrolyte secondary batteries) according to Examples 1 to 64 shown in Tables 1 to 4 were established.

Example 1

A separator was prepared according to the following procedure. First, as a separator substrate (substrate layer), a substrate sheet (average thickness: 20 μm, air permeability: 320 sec) having a triple layer structure in which a porous polypropylene layer was formed on both surfaces of a porous polyethylene layer was prepared. Furthermore, by mixing alumina as an inorganic filler and an acrylic binder as a binder with deionized water such that a mass ratio between these materials became inorganic filler:binder=97:3, thereby preparing a paste-like composition for forming the heat resistance layer described above. Then, the entirety of one surface of the separator substrate was coated with the composition for forming the heat resistance layer, and the composition was dried, thereby preparing a separator having a heat resistance layer on one surface of the separator substrate. At this time, the average total thickness of the separator was 25 μm (that is, the average thickness of the heat resistance layer was 5 μm).

The average particle size ($D_{50}$) and the BET specific surface area of the inorganic filler used for preparing the separator was measured by a laser scattering-type particle size analyzer (manufactured by NIKKISO CO., LTD., MICROTRAC HRA) and a specific surface area analyzer manufactured by Shimadzu Corporation respectively. Furthermore, for preparing the composition for forming the heat resistance layer, by using an ultrasonic disperser (CLEARMIX manufactured by M Technique Co., Ltd.), the aforementioned materials were mixed and kneaded by being preliminarily dispersed for 5 minutes at 15,000 rpm and then finally dispersed for 15 minutes at 20,000 rpm. In addition, the substrate layer (separator substrate) was uniformly coated with the composition for forming the heat resistance layer by a gravure coating method.

Thereafter, according to the following procedure, a fiber layer was formed on the heat resistance layer of the separator. PVDF (average molecular weight: 600,000) and PTFE (average molecular weight: 600,000) were dissolved in NMP such that a mass ratio between these materials became PVDF:PTFE=70:30, thereby preparing a solution for forming a fiber layer. By an electrospinning method, the solution for forming the fiber layer was spun, and the obtained fiber was deposited onto the heat resistance layer of the separator, thereby forming a fiber layer on the heat resistance layer of the separator. At this time, the average thickness of the fiber layer was 3.5 μm. The average molecular weight of the components of the synthetic resin configuring the fiber contained in the fiber layer means a number average molecular weight (Mn), and the same is true of the following description. Herein, the electrospinning method was performed using an electrospinning device including a high-voltage power supply, a solution tank, a syringe pump, and a needle nozzle (spinning nozzle), under the conditions of a voltage applied to the spinning nozzle (needle nozzle) of 10 kV to 15 kV, a distance between the spinning nozzle and the surface for forming the fiber layer (herein, the surface of the heat resistance layer of the separator) of 10 cm to 20 cm, and the supply amount (supply speed) of the solution for forming a fiber layer of 0.2 mL/min to 0.3 mL/min. The average thickness of the fiber layer was determined by analyzing an image captured by a scanning electron microscope (SEM).

A positive electrode was prepared according to the following procedure. $LiNi_{0.33}Co_{0.33}Mn_{0.33}O_2$ (LNCM) as positive electrode active material powder, AB as a conductive material, and PVDF as a binder were mixed with NMP such that a mass ratio between these materials became LNCM:AB:PVDF=90:8:2, thereby preparing a slurry-like composition for forming a positive electrode active material layer. Both surfaces of elongate aluminum foil (positive electrode current collector) having a thickness of 15 μm was coated with the composition in the form of a belt, and the composition was dried and pressed, thereby preparing a positive electrode sheet. The amount of the composition for forming the positive electrode active material layer with which the foil was coated and the pressing conditions were adjusted such that the average thickness of the positive electrode became about 65 μm (the average thickness of the positive electrode active material layer on one surface of the foil became about 25 μm).

A negative electrode was prepared according to the following procedure. First, as negative electrode active material powder, graphite (C) whose surface was coated with amorphous carbon was prepared. Thereafter, the graphite (C), styrene buadinene rubber (SBR), and CMC as a thickener were mixed with deionized water at a mixing ratio of C:SBR:CMC=98:1:1, thereby preparing a slurry-like composition for forming a negative electrode active material layer. Both surfaces of elongate copper foil (negative electrode current collector) having a thickness of 10 μm were coated with the composition in the form of a belt, and the composition was dried and pressed, thereby preparing a negative electrode sheet. The amount of the composition for forming a negative electrode active material layer with which the foil was coated and the pressing conditions were adjusted such that the average thickness of the negative electrode became about 80 μm (the average thickness of the negative electrode active material layer on one surface of the foil became about 35 μm).

By using one sheet of the positive electrode and one sheet of the negative electrode prepared as above and two sheets of the separators prepared as above, a roll-type electrode unit was prepared. That is, the positive and negative electrodes were laminated together with the separators which are interposed between the electrodes and in which the fiber layer was formed on the surface of the heat resistance layer, such that an active material layer non-formation portions of the electrodes were positioned on opposite sides, and the heat resistance layer of each separator (that is, the fiber layer on the heat resistance layer) was in a direction facing the negative electrode (negative electrode active material layer). In the present embodiment, the positive electrode, the negative electrode, and the separators were laminated such that heat resistance layer of each separator (that is, the fiber layer on the heat resistance layer) was in a direction facing the negative electrode (negative electrode active material layer). However, the heat resistance layer of each separator (that is, the fiber layer on the heat resistance layer) may face the positive electrode (positive electrode active material layer) or face both the negative electrode (negative electrode active material layer) and the positive electrode (positive electrode active material layer). The laminated positive electrode, the negative electrode, and the separators were rolled up (wound up) 130 times (that is, the number of times the electrode and the separators were rolled was 130) at a rolling tension of 1 N/mm$^2$ in the longitudinal direction. Thereafter, the obtained roll unit (the positive electrode, the negative electrode, and the separators after winding) was pressed and pushed down in a direction orthogonal to the winding axis, thereby preparing a flat roll-type electrode unit. The roll-type electrode unit was 130 mm long in the direction of the winding axis (longitudinal direction) and 50 mm long in a direction (short direction) orthogonal the direction of the winding axis.

Then, the roll-type electrode unit of each of the aforementioned examples was accommodated in an angulated battery container (angulated battery case) made of aluminum, a nonaqueous electrolyte was injected thereinto from an opening portion of the battery case, and then the opening portion was sealed air-tight, thereby preparing lithium ion secondary batteries (nonaqueous electrolyte secondary batteries) of the respective examples. As the nonaqueous electrolyte, an electrolyte was used which was obtained by dissolving LiPF$_6$ as a supporting salt in a solvent mixture containing EC, EMC, and DMC at a volume ratio of EC:EMC:DMC=30:40:30 at a concentration of 1.1 mol/L.

Example 2

A battery according to Example 2 was prepared by using the same materials and the same process as in Example 1, except that the mass ratio between PVDF and PTFE in the composition for forming a fiber layer was changed to PVDF:PTFE=60:40.

Example 3

A battery according to Example 3 was prepared by using the same materials and the same process as in Example 1, except that a substrate sheet (average thickness: 20 μm, air permeability: 100 sec) composed of a porous polyethylene layer (PE) was used as the separator substrate, and a solution obtained by dissolving PVDF (average molecular weight: 200,000) in NMP was used as the composition for forming a fiber layer.

Example 4

A battery according to Example 4 was prepared by using the same materials and the same process as in Example 1, except that PVDF having an average molecular weight of 2,000,000 was used as the PVDF configuring the fiber layer.

Example 5

A battery according to Example 5 was prepared by using the same materials and the same process as in Example 3, except that a solution obtained by dissolving PVDF (average molecular weight: 500,000) and PVF (average molecular weight: 500,000) at a mass ratio of PVDF:PVF=60:40 in NMP was used as the composition for forming a fiber layer.

Example 6

A battery according to Example 6 was prepared by using the same materials and the same process as in Example 5, except that the mass ratio of PVDF and PVF in the composition for forming a fiber layer was changed to PVDF:PVF=70:30.

Example 7

A battery according to Example 7 was prepared by using the same materials and the same process as the battery according to Example 3, except that the fiber layer was not formed.

Example 8

A battery according to Example 8 was prepared by using the same materials and the same process as in Example 1, except that a substrate sheet (average thickness: 20 μm, air permeability: 100 sec) composed of a porous polyethylene layer (PE) was used as the separator substrate; a solution obtained by dissolving PVDF (average molecular weight: 150,000), PTFE (average molecular weight: 700,000), and FEP (average molecular weight: 500,000) in NMP at a mass ratio of PVDF:PTFE:FEP=56:22:22 was used as the composition for forming a fiber layer; and the average thickness of the fiber layer was changed to 1 μm.

Examples 9 to 58

Nonaqueous electrolyte secondary batteries according to Examples 9 to 58 were prepared by using the same materials and the same process as the battery according to Example 8, except that the material and the air permeability of the separator substrate, the average molecular weight of PVDF and PTFE used for forming the fiber layer, the content of PVDF and the content of PTFE (that is, the content of PVDF and the content of PTFE in the solution for forming a fiber layer) contained in the fiber layer (fiber), and the average thickness of the fiber layer were changed as the conditions shown in Tables 2 to 3. In the tables, "PE" indicates a substrate sheet having a single layer structure composed of porous polyethylene (PE); "PE/PP" indicates a substrate sheet having a double layer structure in which a porous polypropylene layer (PP layer) is formed on one surface of a porous polyethylene layer (PE layer); and "PP/PE/PP" indicates a substrate sheet having a triple layer structure in which a porous polypropylene layer (PP layer) is formed on both surfaces of a porous polyethylene layer (PE layer). In a case where the substrate sheet having a double layer structure (that is PE/PP) in which the PP layer is formed on one surface of the PE layer was used as a separator substrate, a heat resistance layer was formed on the surface of the PP layer. Furthermore, unless otherwise specified, in Tables 2 and 3, the batteries in which the content of PVDF and the content of PTFE do not satisfy 100% by mass in total are regarded as batteries containing FEP (average molecular weight: 500,000) in addition to PVDF and PTFE as the components of the synthetic resin configuring the fiber forming the fiber layer. That is, they are regarded as being batteries in which the content (% by mass) of FEP equals 100−(content of PVDF in table+content of PTFE in table). For example, in a case of the battery according to Example 9, the fiber layer was formed by using the composition for forming a fiber layer in which the mass ratio between PVDF, PTFE, and FEP was PVDF:PTFE:FEP=56:22:22.

Example 59

A battery according to Example 59 was prepared by using the same materials and the same process as in Example 1, except that the fiber layer was formed on both surfaces of the separator (that is, the surface of the separator substrate and the surface of the heat resistance layer); a substrate sheet (average thickness: 20 μm, air permeability: 100 sec) composed of a porous polyethylene layer (PE) was used as the separator substrate; a solution obtained by dissolving PVDF (average molecular weight: 500,000), PTFE (average molecular weight: 950,000), and FEP (average molecular weight: 500,000) in NMP at a mass ratio of PVDF:PTFE:FEP=62:27:11 was used as the composition for forming a fiber layer; and the average thickness of the fiber layer was changed to 2.5 μm.

Examples 60 to 62

Batteries according to Examples 60 to 62 were prepared by using the same materials and the same process as in Example 59, except that the fiber layer was formed on the surface of the positive electrode active material layer and the surface of the negative electrode active material layer or formed on the surface of the positive electrode active material layer or on the surface of the negative electrode active material layer. The place where the fiber layer is formed is shown in the corresponding column in Table 4. In Table 4, the surface of the positive electrode active material layer is described as "positive electrode", and the surface of the negative electrode active material layer is described as "negative electrode".

Examples 63 and 64

Batteries according to Examples 63 and 64 were prepared by using the same materials and same process as in Example 62, except that as the separator substrate, a substrate sheet (average thickness: 20 μm, air permeability: 290 sec, having a heat resistance layer formed on the surface of PP layer) having a double layer structure in which a porous polypropylene layer was formed on one surface of a porous polyethylene layer or a substrate sheet (average thickness: 20 μm, air permeability: 325 sec) having a triple layer structure in which a porous polypropylene layer was formed on both surfaces of a porous polyethylene layer was used.

[Measurement of Initial Battery Resistance (IV Resistance)]

Subsequently, initial resistance (IV resistance) of each of the batteries established as above was measured. First, under a temperature condition of 25° C., each of the batteries was charged with a constant current (CC) until the state of charge (SOC) became 60% and then charged with CC for 10 seconds at a rate of 10 C, and a value (V) of voltage increase was measured. By dividing the measured value (V) of voltage increase by the corresponding current value, IV resistance (mΩ) was calculated (typically, the IV resistance (mΩ) is calculated from the slope of a first-order approximation line of a plotted value of current (I)-voltage (V)), and the average was taken as the initial battery resistance. Herein, unless otherwise specified, the "state of charge (SOC)" refers to a charged state of a battery based on a general range of voltage at which the battery is used. For example, "SOC" refers to a charged state based on a rated capacity measured under a condition of an inter-terminal voltage (open circuit voltage (OCV)) of 4.1 V (maximum voltage) to 3.0 V (minimum voltage).

[Charge and Discharge Cycle Test]

Then, for the battery of each of the examples having undergone the measurement of initial resistance, a charge and discharge cycle test was performed in which the battery was charged and discharged for 1,000 cycles under a temperature condition of 25° C., and a rate of resistance increase (%) after the cycle test was calculated. Details of the test are as below. In the charge and discharge cycle test, under a temperature condition of 25° C., the battery was charged with a constant current (CC charging) for 240 seconds at a charge rate of 2.5 C, then suspended from charging for 120 seconds, subjected to discharge of the constant current (CC discharging) for 20 seconds at a discharge rate of 30 C, and then suspended from discharging for 120 seconds. The aforementioned process of charge and discharge was taken as one cycle. For each of the batteries having undergone the charge and discharge cycle test, the battery resistance (IV resistance) after the charge and discharge cycle test was measured in the same manner as used for measuring the initial battery resistance. Thereafter, the rate of resistance increase (%) was calculated from the following equation: Rate of resistance increase (%)=(IV resistance after charge and discharge cycle test−initial battery resistance)÷initial battery resistance×100. The results are shown in the corresponding columns in Tables 1 to 4.

TABLE 1

| | | Separator substrate | | Fiber layer | | | | | | |
| | | | Air permeability | Average molecular weight (×10$^4$) | | | Content (%) | | | Average thickness | Rate of resistance increase |
| Example | Material | | (sec) | PVDF | PTFE | PVF | PVDF | PTFE | PVF | (μm) | (%) |
| 1 | PP/PE/PP | | 320 | 60 | 60 | — | 70 | 60 | 0 | 3.5 | 35 |
| 2 | PP/PE/PP | | 320 | 60 | 60 | — | 60 | 40 | 0 | 3.5 | 40 |
| 3 | PE | | 100 | 20 | — | — | 100 | 0 | 0 | 3.5 | 150 |
| 4 | PE | | 100 | 200 | — | — | 100 | 0 | 0 | 3.5 | 100 |
| 5 | PP/PE/PP | | 320 | 50 | — | 50 | 60 | 0 | 40 | 3.5 | 120 |
| 6 | PP/PE/PP | | 320 | 50 | — | 50 | 70 | 0 | 30 | 3.5 | 110 |
| 7 | PE | | 100 | — | — | — | 0 | 0 | 0 | — | 250 |

TABLE 2

| | Separator substrate | | Fiber layer | | | | | |
|---|---|---|---|---|---|---|---|---|
| | | Air permeability | Average molecular weight (×10⁴) | | Content (%) | | Average thickness | Rate of resistance increase |
| Example | Material | (sec) | PVDF | PTFE | PVDF | PTFE | (μm) | (%) |
| 8 | PE | 100 | 15 | 70 | 56 | 22 | 1 | 110 |
| 9 | PE | 100 | 20 | 70 | 56 | 22 | 1 | 20 |
| 10 | PE | 100 | 50 | 70 | 56 | 22 | 1 | 21 |
| 11 | PE | 100 | 100 | 70 | 56 | 22 | 1 | 22 |
| 12 | PE | 100 | 140 | 70 | 56 | 22 | 1 | 25 |
| 13 | PE | 100 | 200 | 70 | 56 | 22 | 1 | 32 |
| 14 | PE/PP | 280 | 200 | 70 | 56 | 22 | 1 | 40 |
| 15 | PP/PE/PP | 340 | 200 | 70 | 56 | 22 | 1 | 45 |
| 16 | PE | 100 | 220 | 70 | 56 | 22 | 1 | 170 |
| 17 | PE | 100 | 50 | 15 | 57 | 24 | 1.3 | 140 |
| 18 | PE | 100 | 50 | 20 | 57 | 24 | 1.3 | 25 |
| 19 | PE | 100 | 50 | 50 | 57 | 24 | 1.3 | 31 |
| 20 | PE | 100 | 50 | 100 | 57 | 24 | 1.3 | 32 |
| 21 | PE | 100 | 50 | 140 | 57 | 24 | 1.3 | 34 |
| 22 | PE | 100 | 50 | 200 | 57 | 24 | 1.3 | 36 |
| 23 | PE/PP | 275 | 50 | 200 | 57 | 24 | 1.3 | 44 |
| 24 | PP/PE/PP | 320 | 50 | 200 | 57 | 24 | 1.3 | 49 |
| 25 | PE | 100 | 50 | 220 | 57 | 24 | 1.3 | 190 |
| 26 | PE | 100 | 50 | 85 | 80 | 5 | 2.2 | 150 |
| 27 | PE | 100 | 50 | 85 | 60 | 10 | 2.2 | 14 |
| 28 | PE | 100 | 50 | 85 | 60 | 30 | 2.2 | 12 |
| 29 | PE | 100 | 50 | 85 | 50 | 45 | 2.2 | 15 |
| 30 | PE/PP | 277 | 50 | 85 | 50 | 45 | 2.2 | 25 |
| 31 | PP/PE/PP | 345 | 50 | 85 | 50 | 45 | 2.2 | 28 |
| 32 | PE | 100 | 50 | 85 | 35 | 55 | 2.2 | 210 |

TABLE 3

| | Separator substrate | | Fiber layer | | | | | |
|---|---|---|---|---|---|---|---|---|
| | | Air permeability | Average molecular weight (×10⁴) | | Content (%) | | Average thickness | Rate of resistance increase |
| Example | Material | (sec) | PVDF | PTFE | PVDF | PTFE | (μm) | (%) |
| 33 | PE | 100 | 50 | 80 | 25 | 20 | 2 | 200 |
| 34 | PE | 100 | 50 | 80 | 30 | 25 | 2 | 24 |
| 35 | PE | 100 | 50 | 80 | 50 | 20 | 2 | 15 |
| 36 | PE | 100 | 50 | 80 | 80 | 10 | 2 | 10 |
| 37 | PE/PP | 270 | 50 | 80 | 80 | 10 | 2 | 31 |
| 38 | PP/PE/PP | 330 | 50 | 80 | 80 | 10 | 2 | 34 |
| 39 | PE | 100 | 50 | 80 | 85 | 15 | 2 | 180 |
| 40 | PE | 6 | 50 | 50 | 55 | 20 | 0.8 | 120 |
| 41 | PE | 10 | 50 | 50 | 55 | 20 | 0.8 | 15 |
| 42 | PE | 30 | 50 | 50 | 55 | 20 | 0.8 | 20 |
| 43 | PE | 50 | 50 | 50 | 55 | 20 | 0.8 | 23 |
| 44 | PE | 100 | 50 | 50 | 55 | 20 | 0.8 | 28 |
| 45 | PE | 180 | 50 | 50 | 55 | 20 | 0.8 | 33 |
| 46 | PE | 240 | 50 | 50 | 55 | 20 | 0.8 | 40 |
| 47 | PE/PP | 300 | 50 | 50 | 55 | 20 | 0.8 | 45 |
| 48 | PP/PE/PP | 350 | 50 | 50 | 55 | 20 | 0.8 | 48 |
| 49 | PE | 400 | 50 | 50 | 55 | 20 | 0.8 | 150 |
| 50 | PE | 100 | 50 | 90 | 60 | 26 | 0.2 | 140 |
| 51 | PE | 100 | 50 | 90 | 60 | 26 | 0.5 | 9 |
| 52 | PE | 100 | 50 | 90 | 60 | 26 | 1.5 | 11 |
| 53 | PE | 100 | 50 | 90 | 60 | 26 | 3 | 12 |
| 54 | PE | 100 | 50 | 90 | 60 | 26 | 4 | 15 |
| 55 | PE | 100 | 50 | 90 | 60 | 26 | 6 | 19 |
| 56 | PE/PP | 285 | 50 | 90 | 60 | 26 | 6 | 26 |
| 57 | PP/PE/PP | 310 | 50 | 90 | 60 | 26 | 6 | 28 |
| 58 | PE | 100 | 50 | 90 | 60 | 26 | 7 | 170 |

TABLE 4

| | | Separator substrate | Fiber layer | | | | | Rate of resistance increase |
|---|---|---|---|---|---|---|---|---|
| | | Air permeability | Average molecular weight (×10⁴) | | Content (%) | | | |
| Example | Material | (sec) | PVDF | PTFE | PVDF | PTFE | Place | (%) |
| 59 | PE | 100 | 50 | 95 | 62 | 27 | Both surfaces of separator | 5 |
| 60 | PE | 100 | 50 | 95 | 62 | 27 | Positive and negative electrodes | 7 |
| 61 | PE | 100 | 50 | 95 | 62 | 27 | Positive electrode | 12 |
| 62 | PE | 100 | 50 | 95 | 62 | 27 | Negative electrode | 10 |
| 63 | PE/PP | 290 | 50 | 95 | 62 | 27 | Positive electrode | 23 |
| 64 | PP/PE/PP | 325 | 50 | 95 | 62 | 27 | Positive electrode | 26 |

As shown in Table 1, the battery according to Example 7 not having a fiber layer exhibited an extremely high rate of resistance increase after the high-rate charge and discharge. It is considered that this is because the active materials in the positive and negative electrodes expanded and contracted as the electrode were charged and discharged, hence pores of the separator were crushed and the nonaqueous electrolyte with which the separator was impregnated was discharged out of the separator, and as a result, variation occurs in the amount of the nonaqueous electrolyte held in the electrode unit. In contrast, the rate of resistance increase after repeated high-rate charge and discharge was more markedly reduced in the batteries according to Examples 1 and 2 (the rate of resistance increase was equal to or less than 50%) than in the battery according to Example 7 not having a fiber layer. That is, if the battery has a fiber layer, which contains fiber containing at least PVDF or PTFE both having an average molecular weight of equal to or greater than 200,000 and equal to or less than 2,000,000, and in which the content of PVDF in the components of the synthetic resin configuring the fiber is greater than the content of PTFE and the content of PTFE is equal to or less than 45% by mass with respect to the total amount of the components of the synthetic resin, between the separator and the positive electrode and/or between the separator and the negative electrode, excellent high-rate charge and discharge characteristics can be exhibited. That is, according to the invention, it is possible to provide a nonaqueous electrolyte secondary battery having excellent high-rate charge and discharge characteristics.

In the batteries according to Examples 1 and 2 using a combination of PVDF and PTFE as the components of the synthetic resin configuring the fiber, the rate of resistance increase after repeated high-rate charge and discharge was further reduced than in the batteries according to Examples 3 and 4 using PVDF while not using PTFE and the batteries according to Examples 5 and 6 using a combination of PVDF and PVF. From these results, it was confirmed that if at least PVDF and PTFE are used in combination as the components of the synthetic resin configuring the fiber contained in the fiber layer, the resistance increase after repeated high-rate charge and discharge can be suppressed to a high degree.

The results of the rate of resistance increase after high-rate charge and discharge that were obtained from the batteries according to Examples 9 to 15, 18 to 24, 27 to 31, 34 to 38, 41 to 48, 51 to 57, and 59 to 64 clearly showed that if the batteries have a fiber layer, which contains fiber containing at least PVDF and PTFE both having an average molecular weight of equal to or greater than 200,000 and equal to or less than 2,000,000 as the components of the synthetic resin and in which the content of PVDF in the components of the synthetic resin configuring the fiber is greater than the content of PTFE and the content of PTFE is equal to or less than 45% by mass with respect to the total amount of the components of the synthetic resin, between the separator and the positive electrode and/or between the separator and the negative electrode, excellent high-rate charge and discharge characteristics can be exhibited.

As is evident from the results obtained from the batteries according to Examples 8 to 25 that differed from each other in terms of the average molecular weight of PVDF or PTFE, in the batteries according to Examples 9 to 15 and 18 to 24 in which PVDF and PTFE both have an average molecular weight of equal to or greater than 200,000 and equal to or less than 2,000,000, the rate of resistance increase after repeated high-rate charge and discharge was further reduced (the rate of resistance increase was equal to or less than 50%) than in the batteries according to Examples 8 and 16 in which the average molecular weight of PVDF or PTFE was less than 200,000 and in the batteries according to Examples 17 and 25 in which the average molecular weight of PVDF or PTFE was greater than 2,000,000. From this result, it was confirmed that if PVDF and PTFE both have an average molecular weight of equal to or greater than 200,000 and equal to or less than 2,000,000, the resistance increase after repeated high-rate charge and discharge can be suppressed to a high degree.

In the batteries according to Examples 27 to 31, the rate of resistance increase after repeated high-rate charge and discharge was suppressed to a higher degree than in the battery according to Example 32. That is, it was confirmed that if the content of PVDF in the components of the synthetic resin configuring the fiber contained in the fiber layer is greater than the content of PTFE, and the content of PTFE is equal to or less than 45% by mass with respect to the total amount of the components of the synthetic resin, the resistance increase after repeated high-rate charge and discharge can be suppressed to a high degree. In the battery according to Example 26, the resistance after repeated high-rate charge and discharge was higher than in the batteries according to Examples 27 to 31. It is considered that this is because the content of PTFE in the fiber configuring the fiber layer was too small, the fiber layer was easily crushed, and thus the nonaqueous electrolyte could not be easily held in the fiber layer. From these results, it was confirmed that the content of PTFE in the components of the synthetic resin configuring the fiber contained in the fiber layer is preferably equal to or greater than 10% by mass and equal to or less than 45% by mass with respect to the total amount of the components of the synthetic resin.

In the batteries according to Examples 33 and 39, the resistance increase after repeated high-rate charge and discharge occurred at a higher rate than in the batteries according to Examples 34 to 38. Regarding Example 33, it is considered that because the content of PVDF in the fiber configuring the fiber layer was too small, the effect of holding the nonaqueous electrolyte in the fiber layer was not sufficiently exhibited. Regarding the battery according to Example 39, it is considered that because the content of PVDF in the fiber configuring the fiber layer was too great, the fiber layer held an excess of nonaqueous electrolyte while the positive electrode active material layer or the negative electrode active material layer lacked the nonaqueous electrolyte. From these results, it was confirmed that the content of PVDF in the components of the synthetic resin configuring the fiber contained in the fiber layer is preferably equal to or greater than 30% by mass and equal to or less than 80% by mass with respect to the total amount of the components of the synthetic resin.

In the batteries according to Examples 40 and 49, the resistance increase after repeated high-rate charge and discharge occurred at a higher rate than in the batteries according to Examples 41 to 48. Regarding Example 40, it is considered that because the air permeability of the separator was too small, the fiber configuring the fiber layer was put into the separator, and thus the pores were clogged. In contrast, it is considered that in the battery according to Example 49, because the air permeability of the separator was too great, the adhesiveness between the fiber layer and the separator deteriorated. From these results, it was confirmed that the air permeability of the separator is preferably equal to or greater than 10 sec to equal to or less than 350 sec. Furthermore, from the comparison between the batteries according to Examples 41 to 48, it was confirmed that the smaller the air permeability of the separator, the further the resistance increase after repeated high-rate charge and discharge can be suppressed.

In the batteries according to Examples 50 and 58, the resistance increase after repeated high-rate charge and discharge occurred at a higher rate than in the batteries according to Examples 51 to 57. Regarding Example 50, it is considered that because the thickness of the fiber layer was too small, the amount of the nonaqueous electrolyte that could be held in the fiber layer was reduced. In contrast, it is considered that in the battery according to Example 58, the thickness of the fiber layer was too great, and thus the distance between the positive electrode active material layer and the negative electrode active material layer increased too much. From these results, it was confirmed that the thickness of the fiber layer is equal to or greater than 0.5 µm and equal to or less than 6 µm. Furthermore, it was confirmed that the smaller the average thickness of the fiber layer compared to Examples 51 to 57, the further the resistance increase after repeated high-rate charge and discharge can be suppressed.

From the results obtained from Examples 59 to 64, the fiber layer in the invention may be formed not only on the surface of the heat resistance layer of the separator but also on the surface of the separator substrate, the surface of the positive electrode active material layer (surface of the positive electrode), and the surface of the negative electrode active material layer (surface of the negative electrode). That is, if the battery has the fiber layer between the separator and the positive electrode active material layer and/or between the separator and the negative electrode active material layer, the high-rate charge and discharge characteristics can be improved. In Example 59 in which the fiber layer was formed on both surfaces of the separator and in Example 60 in which the fiber layer was formed on both the surface of the positive electrode active material layer and the surface of the negative electrode active material layer, the resistance increase was particularly markedly suppressed. From these results, it was conformed that the battery more preferably has the fiber layer between the separator and the positive electrode active material layer and between the separator and the negative electrode active material layer.

Hitherto, specific examples of the invention have been described in detail, but the embodiments and examples described above are merely examples.

What is claimed is:
1. A nonaqueous electrolyte secondary battery, comprising:
   a flat roll electrode unit including an elongated positive electrode, an elongated negative electrode, an elongated separator that electrically separates the positive and negative electrodes from each other, and a fiber layer that is disposed at least between the separator and the positive electrode or between the separator and the negative electrode and contains fiber composed of synthetic resin components are superimposed on each other, and the flat roll electrode unit is wound up together in a longitudinal direction; and
   a nonaqueous electrolyte,
   wherein the fiber layer contains at least polyvinylidene fluoride and polytetrafluoroethylene as the synthetic resin components configuring the fiber,
   the polyvinylidene fluoride and the polytetrafluoroethylene both have an average molecular weight of equal to or greater than 200,000 and equal to or less than 2,000,000, and
   in the synthetic resin components configuring the fiber, a content of the polyvinylidene fluoride is greater than a content of the polytetrafluoroethylene, and the content of the polytetrafluoroethylene is equal to or less than 45% by mass with respect to a total amount of the synthetic resin components.

2. The nonaqueous electrolyte secondary battery according to claim 1,
   wherein in the components of the synthetic resin configuring the fiber, the content of the polyvinylidene fluoride is equal to or greater than 30% by mass and equal to or less than 80% by mass with respect to the total amount of the components of the synthetic resin.

3. The nonaqueous electrolyte secondary battery according to claim 1,
   wherein the fiber layer has an average thickness of equal to or greater than 0.5 µm and equal to or less than 6 µm.

4. The nonaqueous electrolyte secondary battery according to claim 1,
wherein the separator has a substrate layer which is made of a synthetic resin and a heat resistance layer which is formed on a surface of the substrate layer and contains heat resistance fine particles, and
the fiber layer is formed on a surface of the heat resistance layer.

5. An assembled battery, comprising a plurality of unit cells electrically connected to each other,
wherein each of the unit cells is the nonaqueous electrolyte secondary battery according to claim 1.

6. The assembled battery according to claim 5,
wherein the unit cells are confined in a state where a confining pressure of equal to or greater than 0.2 MPa and equal to or less than 10 MPa is applied in a direction orthogonal to a flat surface of the flat roll electrode unit included in the unit cells.

* * * * *